May 21, 1963 R. M. EISENBERG 3,090,135
LAND MASS SIMULATOR
Filed April 7, 1959 10 Sheets-Sheet 1

INVENTOR.
ROBERT M. EISENBERG
BY
ATTORNEY

May 21, 1963  R. M. EISENBERG  3,090,135
LAND MASS SIMULATOR
Filed April 7, 1959  10 Sheets-Sheet 2

INVENTOR.
ROBERT M. EISENBERG
BY
ATTORNEY

May 21, 1963 R. M. EISENBERG 3,090,135
LAND MASS SIMULATOR
Filed April 7, 1959 10 Sheets-Sheet 3
FIG. 7.
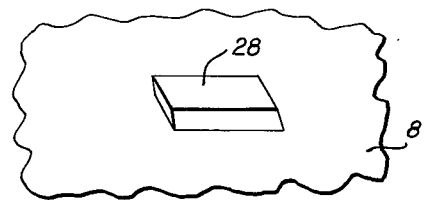
FIG. 8.
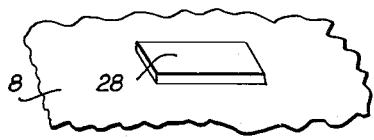
FIG. 10.
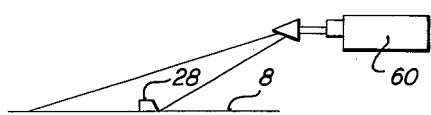
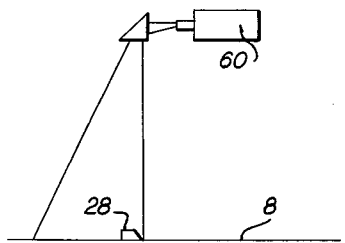
FIG. 9.
FIG. 12.
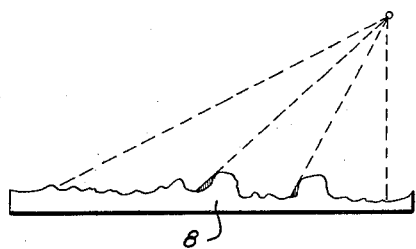
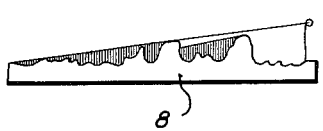
FIG. 11.
INVENTOR.
ROBERT M. EISENBERG
BY
ATTORNEY May 21, 1963  R. M. EISENBERG  3,090,135
LAND MASS SIMULATOR
Filed April 7, 1959  10 Sheets-Sheet 4
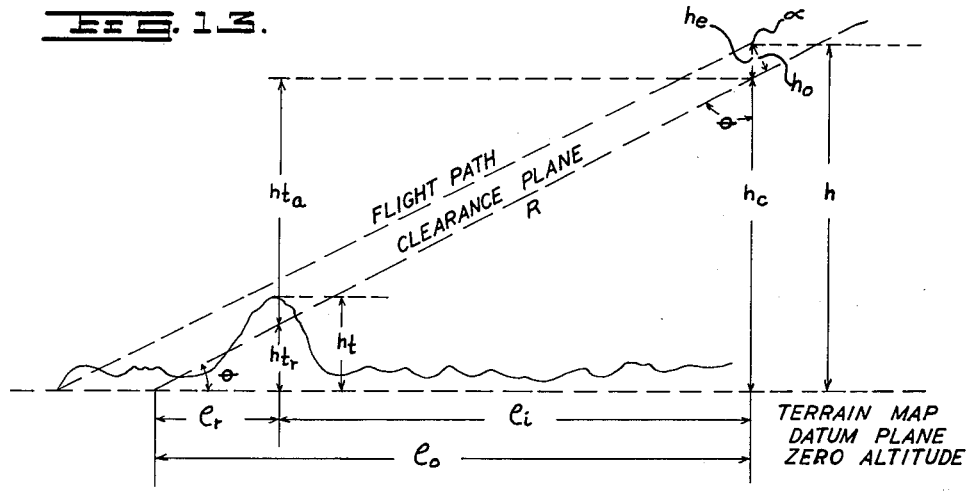
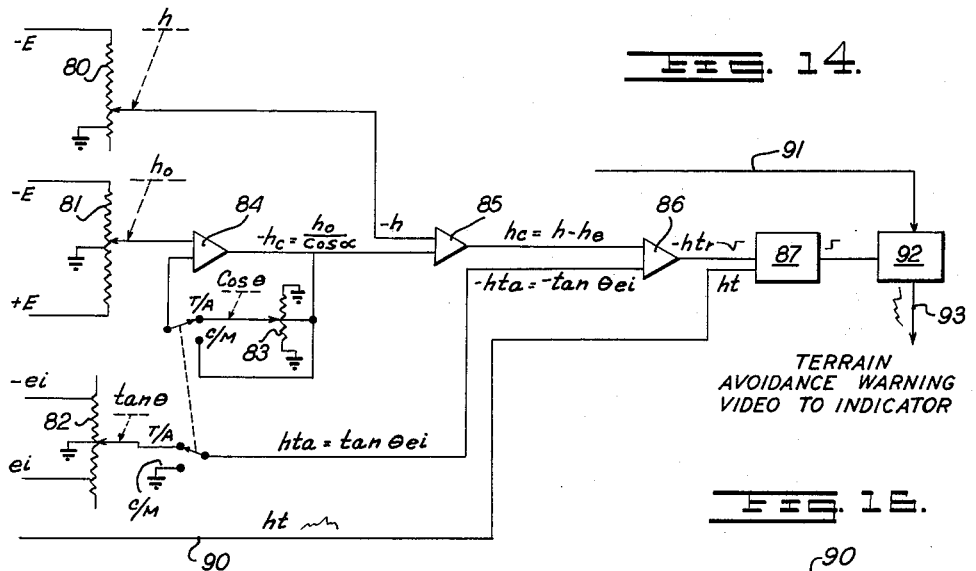
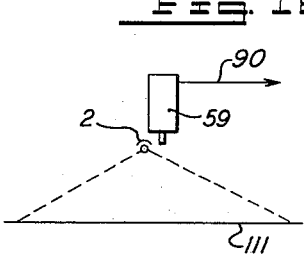
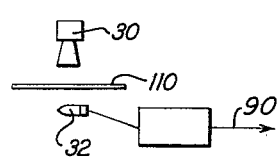
INVENTOR.
ROBERT M. EISENBERG
BY
ATTORNEY May 21, 1963 R. M. EISENBERG 3,090,135
LAND MASS SIMULATOR Filed April 7, 1959 10 Sheets-Sheet 5

INVENTOR
ROBERT M. EISENBERG

BY K. Fredrick Hamann

ATTORNEY

INVENTOR
ROBERT M. EISENBERG

ATTORNEY

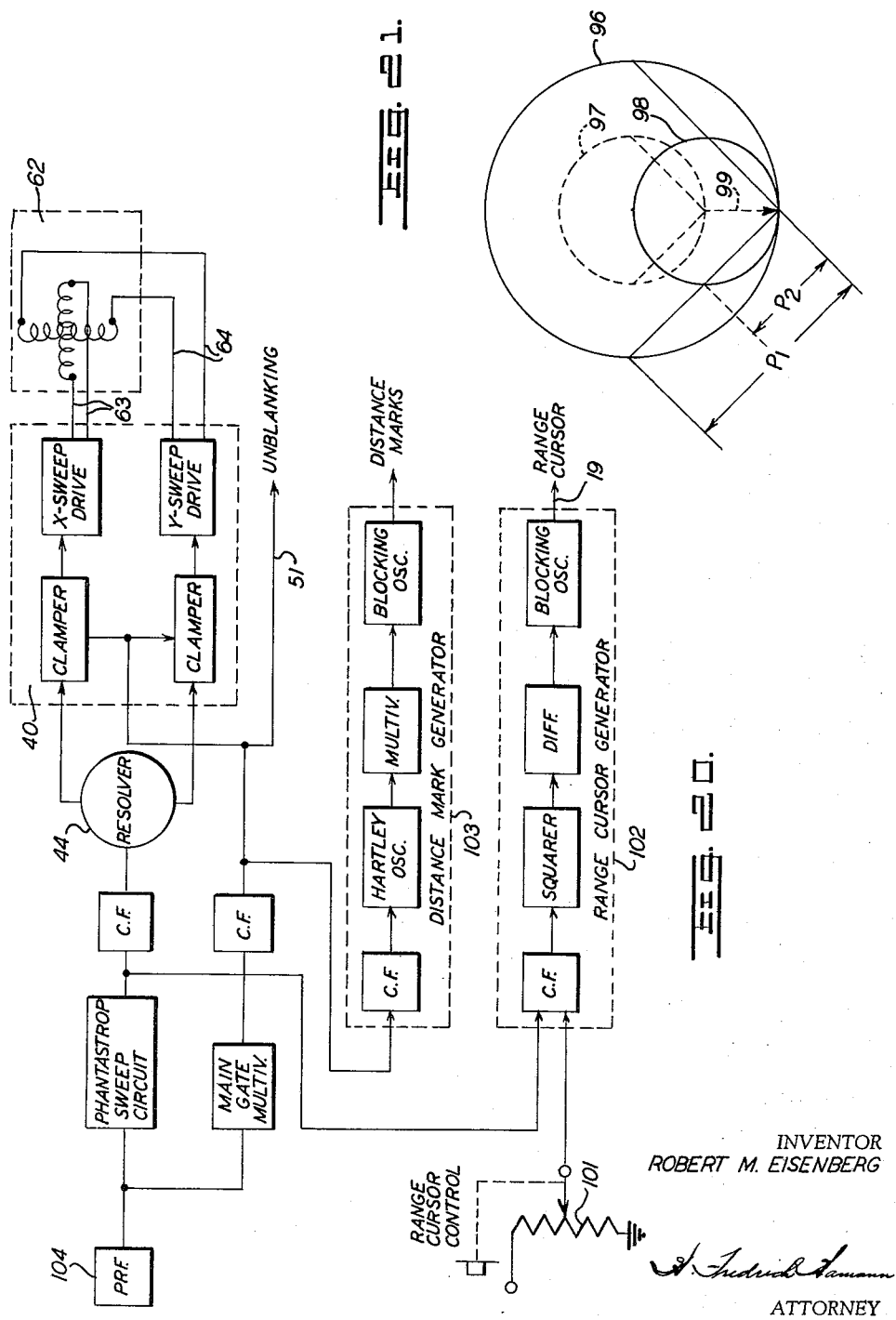

May 21, 1963  R. M. EISENBERG  3,090,135
LAND MASS SIMULATOR

Filed April 7, 1959  10 Sheets-Sheet 8

INVENTOR
ROBERT M. EISENBERG

BY
ATTORNEY

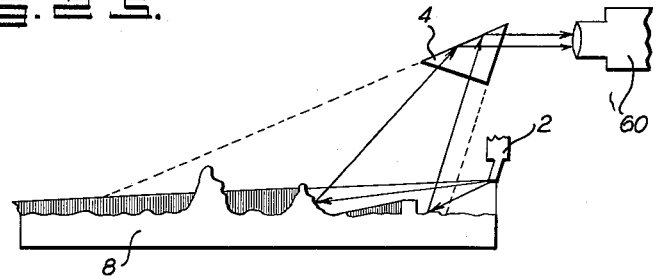
FIG. 25.
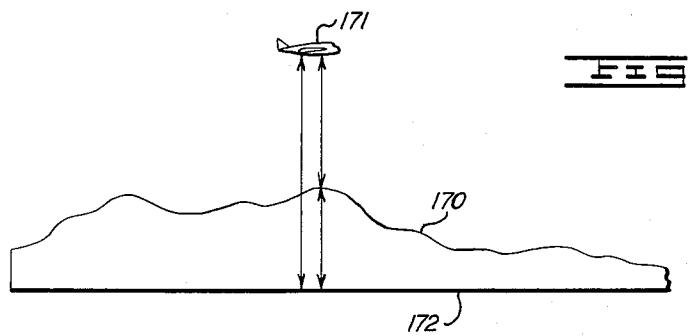
FIG. 27.
FIG. 29.
INVENTOR
ROBERT M. EISENBERG
BY
ATTORNEY

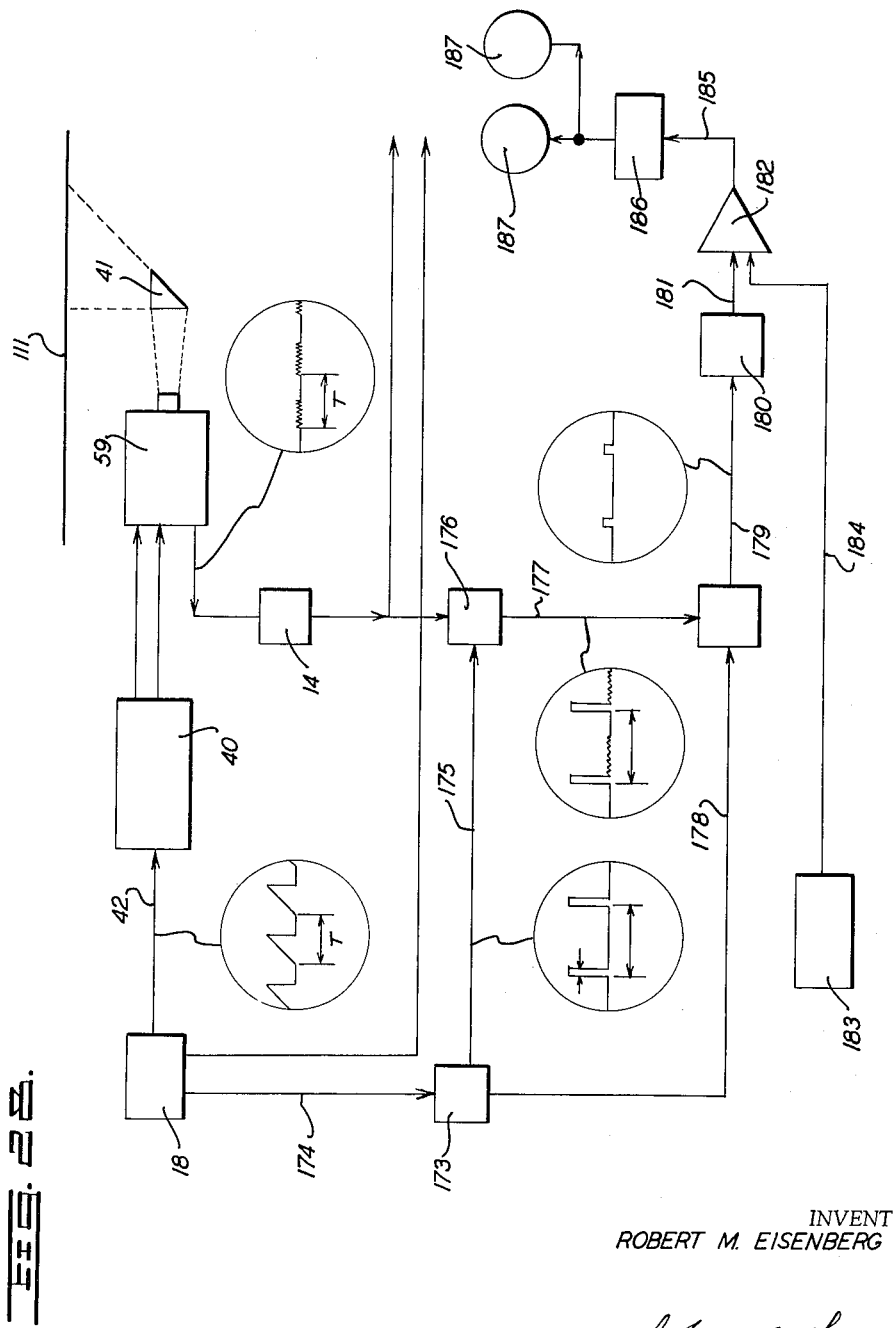

3,090,135
LAND MASS SIMULATOR
Robert M. Eisenberg, Rockville, Md., assignor to ACF Industries, Incorporated, New York, N.Y., a corporation of New Jersey
Filed Apr. 7, 1959, Ser. No. 804,755
8 Claims. (Cl. 35—10.4)

This invention relates to radar simulation apparatus and more particularly to equipment for training student radar operators in the use of ground and contour mapping and terrain avoidance equipment.

This invention is primarily concerned with providing a system for presenting to an opertaor an indicated radar display identical to that which would be observed by an operator in an aircraft operating actual radar equipment. This system is capable of simulating three major modes of operation of a modern radar set which may be designated ground mapping, contour mapping and terrain avoidance. In the ground mapping mode of operation the problem is to simulate the radar return that an actual radar system would present due to radar signal reflections from the terrain proximate to the aircraft. The contour mapping mode of operation is directed to the simulation of displaying on the operator's radar screen those signals which would be indicated on a radar scope when the operator selects a limited field of view below the aircraft. The limit of such a field of view is a horizontal plane below the aircraft and parallel to the earth's surface. One phase of this mode of operation is the equipment's ability to select a specific range of view and to ignore radar signal returns from targets or land masses which are located beyond the range selected. The terrain avoidance mode of operation is similar to the contour mapping mode with the exception that the area being searched in the terrain avoidance mode is in alignment with or measured above or below the longitudinal axis of the aircraft. In this mode the student pilot or radar operator is able to view a segment of the atmosphere above or below the aircraft's line of flight and to discern from his radar scope any obstruction or terrain which appear within the line of flight or immedately above or below it.

Many systems using various techniques have been produced to simulate ground surveillance radar sets. The following is a brief description of some of these devices.

The ultrasonic system is an extensively used technique utilizing the propagation of ultrasonic waves in water. The simulated radar reflection pattern is produced by the sound waves reflected from the surfaces of a three-dimensional terrain model mounted on the bottom of a shallow tank of water. The transducer and pickup are positioned to simulate the aircraft position over the area of interest. The water must be carefully filtered and purified to keep it free from foreign matter. The temperature must be maintained at a specific level to assure a constant propagation velocity. The propagation velocity of sound in water at a given temperature and the propagation velocity of electromagnetic waves in space are physical constants which allow a direct, fixed analogy to be established. The resultant scale ratio for the terrain model is 210,000:1. The ultarsonic system is limited to this scale ratio where the indicator sweeps cannot be changed. Range resolution is poor at short ranges due to severe interference effects therefor limiting the low altitude simulation capability. Many of these problems may be solved but the limited scale ratios and the space requirements for this system make it unattractive for the development as a simulator for today's high performance radar systems.

Another system utilizes a pre-programmed tape or film strip method of display. Actual video signals in a radar receiver may be recorded on tape or film during an actual flight, then played back in a device which will produce the indicator displays. This method is seriously limited since no variables may be introduced into the problem while maintaining the validity of the radar information. The simulation is accurate for one preselected flight path. Such a device may be useful in pre-mission briefing to familiarize a radar observer with the radar pattern of a particular target complex but could not be used successfully as an operational radar simulator.

Another known system relies on a matched photoplate approach to the problem. The matched photoplate has one great advantage over all systems devised to date. This advantage lies in its ability to store huge land mass areas in a small space. Two photoplates are used to accomplish the information storage. One plate contains terrain elevation information, the other stores the reflectivity information for a given altitude. This pair of plates is scanned synchronously by two similar light-optical systems. Light sensitive type tubes are used to convert the light variations into electrical signals which are used to create the indicator displays. Shadow effects are produced synthetically by a computer receiving the terrain elevation video and terrain reflectivity video as inputs.

Scale ratios of 3 million or 4 million to 1 may be used. Thus, large areas of the earth's surface may be represented on two relatively small photoplates. There are several disadvantages which exist at present. These include heating problems due to the high intensity light sources, optical alignment problems which arise from the large scale ratios, poor integration of elevation effects in regard to aspect versus radar reflectivity, and poor low altitude simulation.

Many of the systems being developed and in use as simulators for the higher performance radar sets are classed as light reflective systems. This general class of systems strike a good balance between performance, accuracy of simulation, simplicity, durability, and flexibility. This invention to be described hereinafter may be classified as a light reflective system.

It is therefore a broad object of this invention to provide apparatus for the simulation of radar equipment.

It is a further object of this invention to provide a radar simulating system utilizing a scanned program light sensitive tube and light source in conjunction with a three-dimensional terrain model to simulate radar from land mass formations.

It is a further object of this invention to provide a simulated radar system in which the land mass indications to an operator may be varied in accordance with operator altitude control.

It is a further object of this invention to provide a method of manufacturing transparencies for use of altitude determinations.

Another object of this invention is to provide training apparatus comprising a land mass simulator.

It is a further object of the invention to provide a radar simulation system for presenting to a radar trainee the indicia which a radar operator would observe during the operation of an actual radar system.

Another object of the invention is to provide a radar simulator for aircraft radar operators in which ground mapping, contour mapping and terrain avoidance modes of operation are realistically duplicated.

Another object of this invention is to provide a method of manufacturing a two-dimensional storage device capable of providing three-dimensional terrain elevation information for use with equipment which responds to three-dimensional information.

A further object of this invention is to provide a radiation method of producing a two-dimensional transparency of three-dimensional terrain contours.

Still another object of this invention is to provide a photographic method of producing photo prints containing three dimensional indicia.

Another object of this invention is to provide apparatus for simulating the radiation altimeter indication of an aircraft.

It is still another object of this invention to provide absolute altitude indication material for use in radar simulation systems.

Other novel features and objects of the invention are set forth in the appended claims and the invention as to its organization and its mode of operation will best be understood from a consideration of the following detailed description of the preferred embodiment when used in connection with the accompanying drawings which are hereby made a part of the specification and in which:

FIG. 7 is a high altitude frontal approach view of a target.

FIG. 8 is a low altitude frontal approach view of a target block.

FIG. 9 is a representation of the scanning head assembly as arranged when the simulated aircraft is at high altitudes.

FIG. 10 shows the scanning head assembly as arranged when the simulated aircraft is at low altitude.

FIG. 11 shows the shadow effect from the light source when the simulated aircraft is flying at low altitudes.

FIG. 12 shows the shadowed areas resulting from positioning of the light source as represented by high altitude simulated flight.

FIG. 13 shows the geometry of a three-dimensional map as related to the simulated aircraft position and altitude.

FIG. 14 is the mechanization for solving the altitude responsive radar presentation.

FIG. 15 is a representation of a system employing a scanning device and a transparency for controlling the radar presentation.

FIG. 16 is a representation of a camera scanning system in which an opaque print of the terrain is employed.

FIG. 20 is a simplified block diagram of the synchronizer and vidicon sweep circuits.

FIG. 21 is a representation of the field of view of two lenses which illustrates the scanning pattern compensation.

FIG. 25 is an elevation view showing the orientation of camera and prism when the simulated aircraft is at a low altitude.

FIG. 27 is an elevation view of the relative positions of aircraft, sea level and terrain contour.

FIG. 28 is a block diagram schematic of the video method of providing radar altimeter simulation.

FIG. 29 is a block diagram schematic of the photocell method of providing radar altimeter simulation.

The preferred embodiment of this invention provides for the use of a three-dimensional terrain map and a camera optical system whereby the camera is moved relative to the terrain map in accordance with the movements of the simulated aircraft. The resulting image is conducted to a simulated radar scope within the view of an operator. The three-dimensional terrain model is mounted on a flat bed or frame and may be cast or formed of a plastic material. Cultural areas and target complexes are painted on the map surface as a pattern of spotted gray area or may be cast in relief as blocks of plastic painted the proper color or gray shade corresponding to the radar reflectivity of the object or objects. Water appears as a glossy black surface while land areas are painted a flat gray or are textured with fine grit to yield desired reflective properties.

X-ray and photographic methods of providing two-dimensional transparencies or photo prints of the three-dimensional terrain contours as well as apparatus for simulating a radiation altimeter system are included in the invention.

The apparatus described herein is capable of simulating three modes of operation of a radar system. These three modes are ground mapping, contour mapping and terrain avoidance or clearance.

Figure 19A:
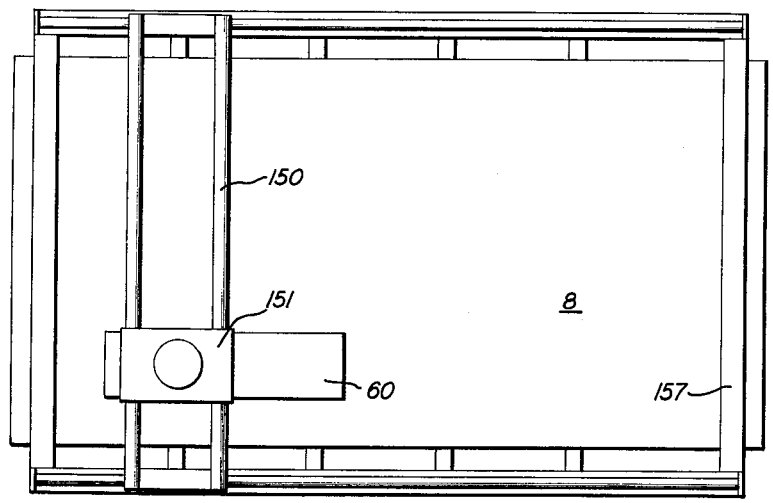
FIGS. 19a, 19b and 19c are representations of the gantry for moving the camera relative to the terrain map.
Figure 19B:
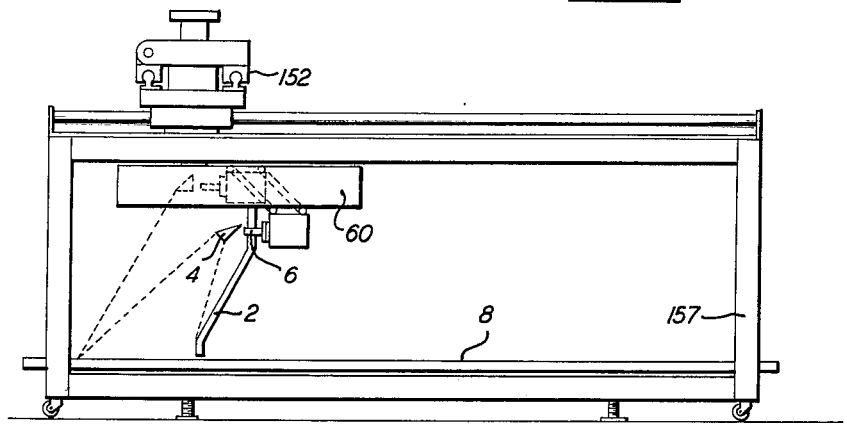
Figure 19C:
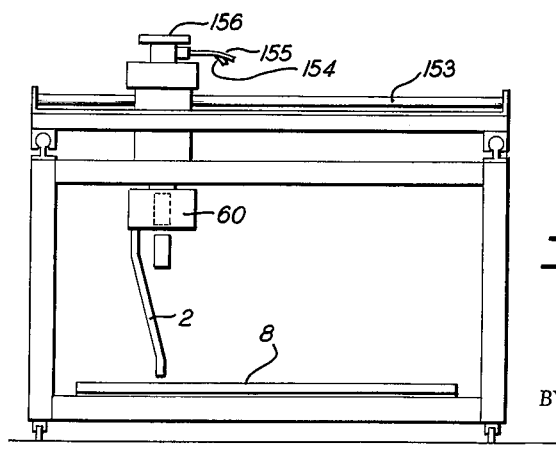

The ground mapping simulation will first be described with reference to FIG. 1 which is a block diagram of the ground mapping mode of operation. The assembly comprises a light source 2, a prism 4 and light pickup device or lens 6 arranged so that they may be positioned in rectangular or polar coordinates over a three-dimensional terrain model 8 in accordance with signals representing the position of the simulated radar carrying aircraft. FIGS. 19a, 19b and 19c show the arrangement of parts of the preferred embodiment wherein the frame 157 is mounted to surround the terrain model 8. The basic camera movement is controlled by a longitudinal carriage 150 and transverse carriage 151 which are motivated in accordance with movement of the simulated aircraft. The bearing housing 152 and guide rod 153 are mounted on the frame 157 while the flexible cord 154, brush block 155 and slip ring assembly 156 move with the camera carriages. The assembly is capable of being rotated with the simulated aircraft bearing signals about a pivot point located near the center rear edge of the prism of FIG. 1. The light source 2 is provided with a vertical drive to enable its altitude above the terrain model datum plane to be varied in accordance with altitude signals representing the altitude of the simulated aircraft. The $xy$ or rectangular coordinate position of the light source 2 relative to the prism 4 is fixed. The front of the light source is at the previously mentioned assembly pivot center line. The light beam emanating from the light source is shaped so as to evenly illuminate a sealed area on the map surface equal to or greater than the azimuth and range search area of the radar being simulated. A representative area of illumination is indicated in FIG. 2 in which the map area illuminated is bounded by the line 10 while the search area visible or within the range of the prism is indicated by line 12.

Figure 3:
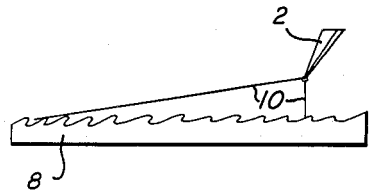
FIG. 3 is an elevation view of the light source and its coverage of FIG. 2.

FIG. 3 is an elevation view of the light source 2 and a portion of the terrain map 8 in which the area covered by the light rays is that which is represented as bounded by lines 10.

Figure 1:
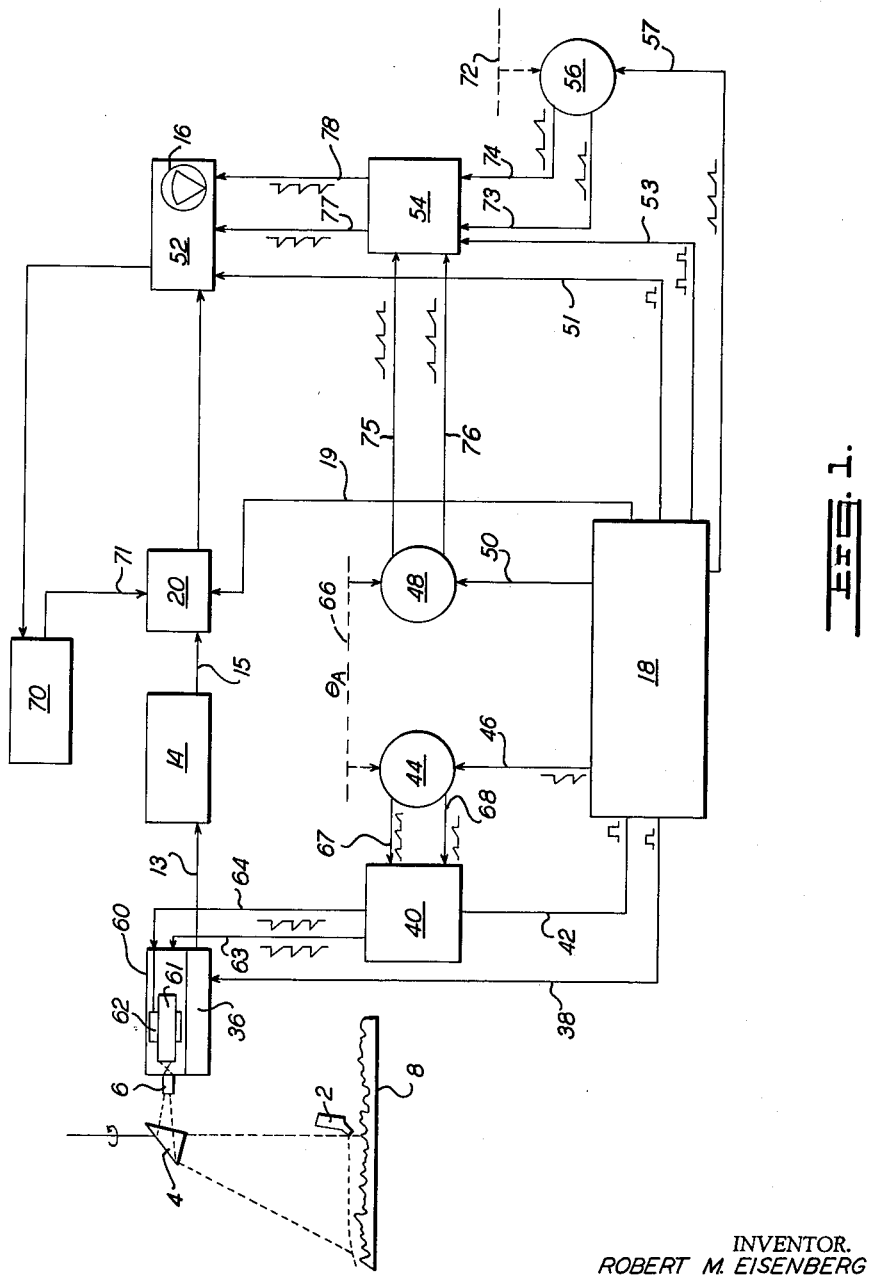
FIG. 1 is a block diagram of the system configuration for simulating the ground mapping mode of the radar equipment.
Figure 2:
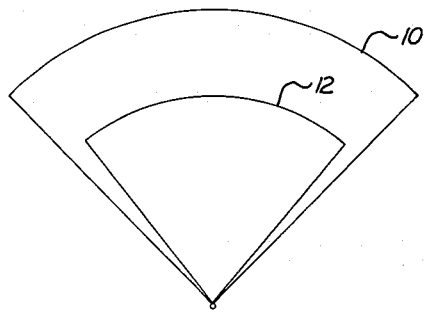
FIG. 2 shows a representative area of illumination of the terrain map.
Figure 4:
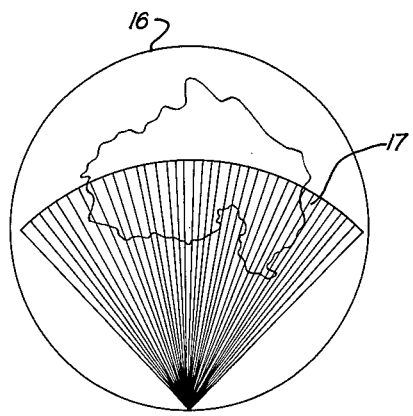
FIG. 4 is a representation of a scanning pattern on the face plate of the simulated radar scope.
Figure 5:
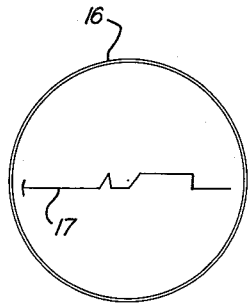
FIG. 5 is an A-scan presentation of the video output from the camera tube for the azimuth sweep 17 of FIG. 4.

As indicated in FIG. 1 the area of interest i.e., the area to be presented on the simulated radar is focused by the lens of the scanning head onto the photocathode of the camera tube. One purpose of the prism 4 is to enable mounting the camera tube in the horizontal position so as to avoid the possibility of loose particles in the tube falling onto the face plate thereby causing damage. However, for some applications, vertical mounting may be preferred. The photocathode is commutated by the electron beam in the camera tube which is deflected in accordance with a P.P.I. sector scanning program. The scanning pattern of the vidicon faceplate is indicated in FIG. 4. FIG. 5 depicts an A-scan presentation of a video output from the vidicon for the azimuth position sweep 17 indicated. The sweep sees no image, a small land image, no image, large land image and then no image as the sweep progresses from center to outer tube edge. The low level signals obtained from the camera tube are amplified by means of suitable video amplifiers 14, clamped to a reference level and applied to the grid or cathode of the radar indicator tube 16. The P.P.I. scan is generated by resolving a sweep of suitable waveform into its $x$ and $y$ components about the azimuth bearing representing the aircraft heading.

A similar scanning is utilized to sweep the radar indicator tube screen in synchronism with the camera tube sweep. The video signals applied to the radar indicator cathode ray tube cause intensification of the trace of the correct position thereby painting on the indicator the image present on the photoconductive face plate of the camera tube. With the terrain model constructed according to radar return prediction data the presentation of the radar indicator is an accurate simulation of the presentation that would be observed on an actual airborne radar set over the terrain. Although a P.P.I. sector display is described here other types may be simulated with this technique. Any type of scan utilized by search radar systems is capable of being simulated by this sytsem.

The sweeps, gating pulses, unblanking and clamping pulses and range marks are generated in the synchronizer unit 18. The design of the circuits in the synchronizer may be arranged to accommodate various pulse repetition rates, range mark spacing, altitude delay circuits and sweep expansion circuits so that any radar set performance may be accurately simulated. FIG. 20, which is described generally with FIG. 1, below, is a simplified block diagram of a typical synchronizer circuit, vidicon sweep circuit and radar indicator sweep circuit for the simulation of a ground mapping radar system including distance mark generation and range cursor generation. The synchronizer circuit of FIG. 20 includes a pulse repetition frequency source 104 which drives the distance mark generator 103 as well as the range cursor generator 102 which, with an input from the range cursor control potentiometer 101, provides the range cursor output signals at conductor 19. The resolver 44 drives amplifier to feed sweep voltages to the deflection coils 62 by means of conductors 63 and 64 as later described. The unblanking pulse on conductor 51 is utilized as next described in reference to FIG. 1.

In FIG. 1 the synchronizer 18 supplies an unblanking pulse to the scanning head pre-amplifier 36 by way of conductor 38, a clamp pulse to the deflection amplifier and clamp circuits 40 by way of conductor 42, a sweep signal to resolver 44 thru conductor 46, a sweep signal to resolver 48 thru conductor 50, range cursors to the mixer 20 thru conductor 19, unblanking and clamp pulses to the radar indicator 52 thru lead 51, time share pulses to the azimuth cursor multiplex unit 54 by way of connection 53 and a sweep signal to the azimuth cursor resolver 56 by way of conductor 57.

The scanning head 60, comprising the lens 6, camera tube 61, deflection coils 62 and pre-amplifier 36 receives scanning signals from the deflection amplifier 40 by way of conductors 63 and 64. These sweeps are obtained by the action of the sweep signal on conductor 46 being resolved into sine and cosine components by resolver 44 which has its rotor positioned by the antenna bearing shaft 66, designated $\theta A$. These resolved sweeps are conducted to deflection amplifier 40 by conductors 67 and 68 and thence to the scanning head by conductors 63 and 64. The unblanking pulse of lead 38 allows the video signal from the camera tube 61 to pass over conductor 13 to the video amplifier 14 and from there to the mixer amplifier 20 by way of lead 15. The video output of mixer 20 is a composite of the video from amplifier 14, range cursors from the synchronizer on lead 19 and special effects from the special effects generator 70 which conducts its signals to the mixer by conductor 71.

The resolver 56 generates azimuth cursor sweeps by the action of positioning the resolver rotor according to operation of the azimuth cursor control 72, to resolve the sweep applied to the resolver rotor into its sine and cosine components which appear on leads 73 and 74. The azimuth cursor multiplex unit 54 passes deflection sweep signals to the radar indicator 52 in the following manner. The radar indicator sweeps are generated by passing a synchronizer sweep signal thru conductor 50 to the rotor of antenna bearing shaft resolver 48. The resolved sweep signals are passed to the multiplex unit 54 by leads 75 and 76. The combined sweeps and cursor mark are passed to the radar indicator deflection coils by leads 77 and 78. In this manner video and sweep signals in accordance with the camera pickup are presented on the radar indicator at the azimuth position indicated by the antenna azimuth shaft and cursor signals appears at the azimuth angle selected by the operator by movement of his azimuth cursor control 72.

Various effects such as jamming, noise or the addition of electronically generated air targets are introduced from the special effects generator 70, into the system by means of a video mixer 20 as indicated in FIG. 1.

The simulated radar equipment has an operator control range selector which effects changes in the lens field of view. The lenses are mounted in a turret on the camera. The turret is remotely switched from the range selection control on the radar operator's set control not shown. A wide angle lens is used for the longest range coverage. When shorter range operation is selected a lens with a narrower field of view is positioned in optical alignment with the vidicon and prism. Since the field of view is narrowed concentrically the prism must be tilted slightly about its lateral axis to return the rearmost edge of the field of view of the zero ground range point. FIG. 21 shows the field of view of two lenses and demonstrates the rearward shift necessary to accomplish the scanning pattern compensation. With the lowest point of circle 96 representing zero ground range, the dotted line 97 of FIG. 21 represents the field of view of short range lens without compensation. When the prism is tilted slightly to move the field of view to pass through the zero ground range point the compensated field of view of the short range lens becomes the area encompassed by circle 98. The field of view of a long range lens is illustrated by circle 96 and its range coverage is represented as P1. The range coverage of the narrow angle or short range lens may be designated on P2 of FIG. 21. The dotted line 99 represents the movement of the zero range point as the prism is tilted.

The light source used with this technique consists of a lamp and housing, a collimating optical assembly and a light pipe. The lamp is of a relatively low power. The light pipe is constructed of a Lucite plastic rod ⅛" in diameter. This Lucite rod is shaped at its lower end to disperse the light in the pattern indicated in FIG. 3. This approach is used to allow the light source to travel in depressions in the terrain model surface, thereby enhancing the low altitude simulation.

A low power light may be used as a source for two reasons. First, this technique does not depend on a programmed light beam with its many optical elements. The light losses do not necessitate a high intensity lamp to transmit the necessary light through multiple optical interfaces to the map's surface. Second, the camera tube possesses excellent photosensitivities. Some of the camera tubes now in production are capable of producing satisfactory video signals with as little as 0.2 footcandle of illumination on the faceplate of the tube. The heating problems attended to high intensity shaped beam sources are thereby eliminated, allowing the light source to travel in close proximity to the map surfaces without danger of causing damage to the plastic material. Since the light source will be very close to the surfaces during the low altitude operation a means of preventing physical damage due to a collision with the map is provided.

Figure 22:
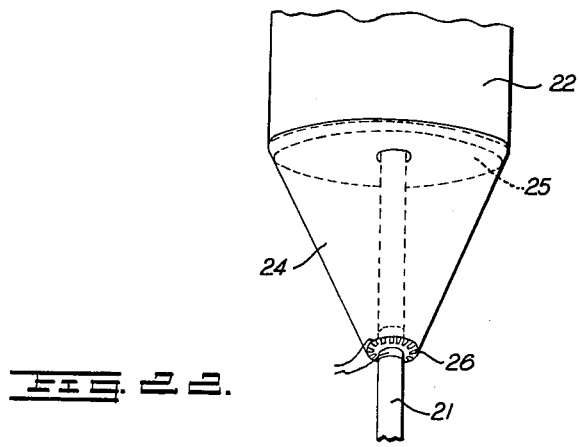
FIG. 22 is a perspective view of the light source including the collision switch mechanism.
Figure 23:
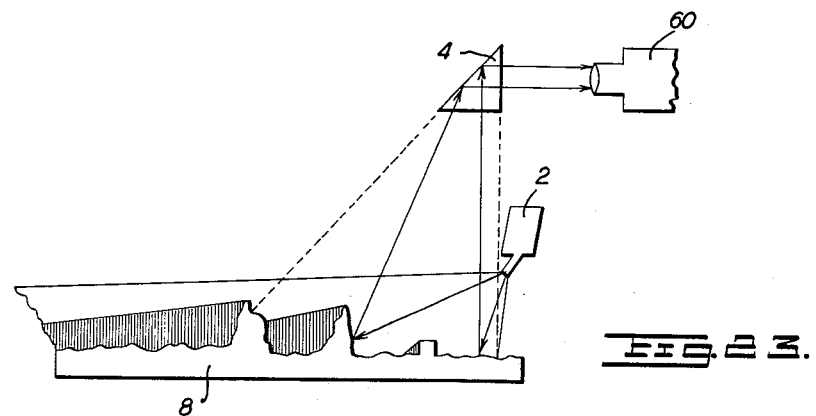
FIG. 23 is an elevation view showing the orientation of camera and prism when the simulated aircraft is at a medium altitude.

FIG. 22 is a sketch of a portion of the light source showing the collision switch constructed as an integral part of the light source assembly. The Lucite rod 21 passes through a rubber grommet 25 at the upper end of its support housing 22. At the lower end of this support housing a ring of metal feelers 24, similar to finger stock material is fastened to just clear the Lucite rod. At this point on the Lucite rod a metal band 26 is fastened and connected to a collision relay circuit, not shown, through appropriate wiring. A wire connected to the metal feelers completes the circuit should the Lucite rod bend and touch the feelers. This will ocur if the lower end of the rod strikes the map surface with a force greater than approximately 5 grams. Actuation of the collision relay will lock the horizontal and vertical drive surfaces and require that the light source be slewed or moved upward before the servos can be reactivated. When the radar simulator is used as a part of an operational flight simulator this collision may be used to energize the crash system indicating a collision with the earth's surface.

The map is constructed of a plastic material and cast from a master mold. The target complexes are stored in relief with blocks of the map material representing targets and groups of targets. Water is represented by a glossy black surface. A class "1" or highly reflective target is painted white on the faces of the target blocks. Three shades of gray are used to represent targets of lower reflectivity classification and terrain. Texturing is used where applicable to create rough surface terrain reflectivity. The resultant model is a three-dimensional radar prediction map of a portion of the earth's surface. Target areas are constructed as inserts so that they may be removed and replaced by modified target areas. Small changes may be made on the model's surface by hand if the proper tools are used. The target inserts are faired into the surrounding map contours so that the line of demarkation is not visible to the camera. The entire map is braced on its underside so as to prevent sagging. In one embodiment a map of this type measuring 11' x 5' with necessary integral bracing and mounting provision was utilized. Indexing marks are provided on the edge of the map with an alignment pin mounted in the exact center of the map base to meet with the bushing in the map bed.

Figure 6:
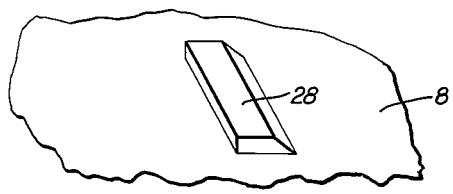
FIG. 6 is a low altitude rear corner view of a target block.

The storage of targets in relief aids in the creation of proper target aspect, cardinal effects and shadowing. A target having a low magnitude radar return with a high angle of incidence may, at low angles, become an outstanding or class 1 return. Construction of such a target type is indicated in FIGS. 6, 7 and 8. FIG. 6 shows a low altitude rear corner view of a faceted target block 28. FIG. 7 shows a high altitude frontal approach view of a target and FIG. 8 shows a low altitude frontal approach view. The front face of the block is painted white. This type of target will produce excellent cardinal effects i.e., a return will be observed only when approaching the target from the proper direction. Groups of these target blocks representing a target complex will create a reflectivity pattern which will vary as a function of approach bearing. Further examination of FIGS. 6, 7 and 8 will indicate that the angle of the target facet can be varied so as to produce "no show" effects at high angles with good return at low angles, or vice versa.

Figure 24:
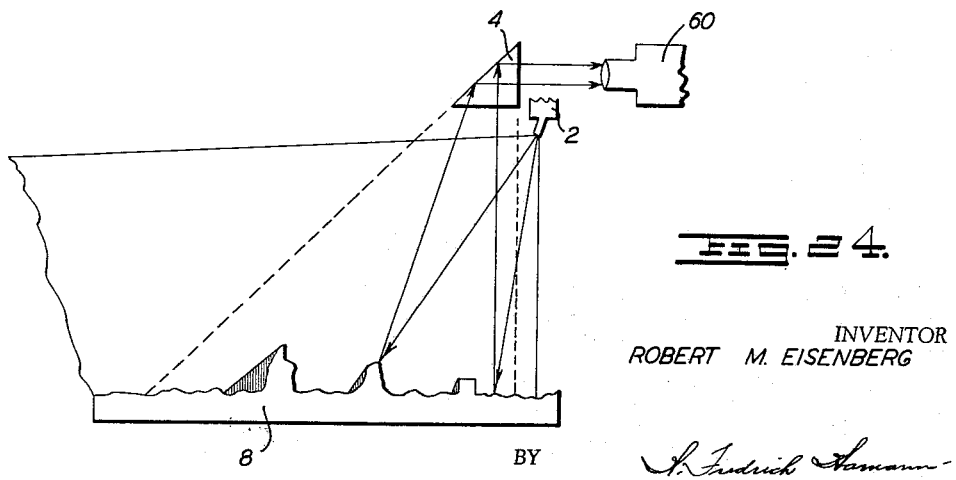
FIG. 24 is an elevation view showing the orientation of camera and prism when the simulated aircraft is at a high altitude.

When the simulated aircraft is at high altitudes the camera and prism are oriented as shown in FIGS. 9 and 24. The view then is essentially perpendicular to the map's surface as shown at FIGS. 12 and 24 and the vertical side of the target blocks are not seen by the camera. At lower altitudes, the prism 4 is rotated to decrease the angle of incidence as shown in FIGS. 10 and 25. In order to continue observing the same map area, the camera is moved back as the prism is rotated so as to maintain the same map area focused on the photocathode. Since the aforementioned action would result in a larger area being observed the camera is lowered so as to maintain the same field of view. The motion of the entire assembly is acomplished smoothly as a function of altitude. At altitudes above 10,000 to 15,000 feet, the exact altitude depending upon the map scaling and system geometry, the assembly is maintained at a fixed height above the model's datum plane. As the simulated aircraft descends through the upper altitude limit a servo motor begins moving the assembly down and aft. The lower limit of the assembly motion is reached as the aircraft descends through the lower altitude limit, 2,000 to 5,000 depending on the lens field of view and system geometry. At any flight altitude below this limit the assembly remains fixed in its lower position. Note that the light source does not move with the camera and prism assembly, but continues to servo to a position simulating the aircraft's position in space. This camera assembly motion is an auxiliary motion used to create good low altitude simulation.

Shadowing effects are realistically produced as the light source is raised and lowered as a function of simulated altitude as indicated by FIGS. 11, 12, 24 and 25. The camera sees only the surfaces of the map which are illuminated. Therefore, the video output from targets and terrain is obtained only when they are not in the shadowed areas.

This system has indicated a resolution capability of 800 lines. The scale range resolution while simulating a radar range of 80 nautical miles is then 608 feet. This exceeds the actual range resolution capability of an airborne ground mapping radar system with a pulse width of 1 microsecond. The range resolution of the simulator improves when shorter radar ranges are simulated.

When this radar simulation device is to be used as a portion of a flight and tactics simulation system the gantry motion, light source motion and the camera motion are programmed from the flight simulators position, bearing and altitude computers, where these computers utilize and compute information as designated below.

$V_n$ = aircraft horizontal velocity
$\psi$ = aircraft heading
$\psi_m$ = orientation of the map major axis
$K$ = scaling factor of the terrain model
$\dot{L}_O$ = longitudinal carriage rate
$\dot{L}_A$ = lateral carriage rate The longitudinal carriage motion is described by the expression $\mathring{L}_O = V_n \cos(\psi - \psi_m)/K$. The lateral carriage motion is described according to the expression $$\mathring{L}_A = V_n \sin(\psi - \psi_m)/K$$

where $\mathring{L}_n$ = rate of vertical motion of the light source.

$\frac{dh}{dt}$ = Rate of change of aircraft altitude

The vertical motion of the light source is described by the expression $$\mathring{L}_h = \frac{dh}{dt}/K$$

The turning rate $$\frac{d\psi}{dt}$$

computed for the simulated aircraft drives the camera, prism and light source assemblies about their turning axes at the rate of turn of the simulated aircraft.

The radar set controls and indicator controls with appearance and function identical to that of the actual radar system are located in the simulator cockpit or simulated aircraft radar operators station. A plot of the simulated aircraft's track of the earth's surface is recorded during a flight or mission, thus allowing a post-mission critique for training purposes.

In addition to its use as an operational training device the system may be installed so as to provide classroom training in the skill of reading and interpreting the displays of a radar system.

A repeat indicator may be provided for a remote location with the necessary set and indicator controls. A preprogrammed flight trace will provide the carriage motions for the radar simulator. A group of radar operators or pilots may then be instructed in the display and interpretation and the correlation of the data presented on the radar indicator with that presented on standard aeronautical charts or radar prediction charts. This device may also be utilized to prepare flight crews for actual operations over unfamiliar terrain.

*Terrain Clearance*

During the terrain clearance mode of operation of a radar system a clearance plane parallel to the flight path of the aircraft is established by the operator at some altitude above or below the aircraft. Only the terrain protruding above the clearance plane is displayed on the radar indicator. This enables the pilot of an aircraft to adjust his let-down or climb-out flight path angle to assure his clearing the terrain by a predetermined altitude. During the contour mapping mode of operation a clearance plane parallel to the earth's plane is established by the operator at some altitude above or below the aircraft. As in the case of terrain clearance, only that terrain protruding above the clearance plane is displayed. This provides for identifying check points and for locating possible let-down areas on the terrain.

The geometry of the terrain avoidance problem is shown in FIG. 13, the required mechanization being shown in FIG. 14. As shown in FIG. 14 the terrain altitude along the radar sweep must be determined. Special equipment in addition to that utilized in the ground mapping mode is used to accomplish this.

In FIG. 14, potentiometers 80, 81, 82 and 83 are energized with voltages as indicated and have their arms motivated by mechanical shafts whose positions are analogous to the values $h$, $h_0$, $\tan \theta$, and $\cos \theta$. The signals picked off by the potentiometer arms are conducted to amplifiers 84, 85 and 86. The output of amplifier 86 which is analogous to $-htr$ is fed to the gate amplifier and clipper 87 where it is combined with the contour video level on conductor 90 to produce a signal to be sent to the video gate 92. This gate circuit 92 accepts the video on lead 91 from the pickup head, and modulates it according to the gate amplifier and clipper output so as to provide an output at 93 which represents terrain avoidance warning video which is transmitted to the radar indicator.

In other words the video from the vidicon tube which is scanning the three-dimensional model appears on conductor 91. This video is gated on and off in accordance with the values of the terrain altitude and the instantaneous altitude of the projected clearance plane. When $ht \geq htr$, the video gate 92 is opened to permit video to be displayed on an indicator. In the contour mapping mode, effects of pitch angle are eliminated, thereby establishing the clearance plane parallel to the ground plane, i.e., $htr = h - ho$. The pickup head sweep is modified in the terrain avoidance mode in order to display slant range. This is mechanized by placing the arms of the ganged switch, associated with the outputs of potentiometers 82 and 83, in the up position. The contour video appearing on conductor 90 is obtained from a transparency having light transmittance capability varying as a function of terrain elevation, or an opaque print having reflectance variance as a function of terrain elevation.

FIG. 15 shows a method utilizing a photo transparency whose emulsion density is inversely proportional to terrain altitude. The area of the earth's surface represented by this transparency is identical to that of the same area depicted by the three-dimensional terrain model in use for the ground mapping problem. A flying spot scanner 30, positioned horizontally in synchronism with the camera prism and light source assembly on the terrain model gantry, and deflected in the same scan program as that of the camera tube, is mounted on one side of the transparency 110. A photomultiplier tube 32 is positioned in the same manner on the opposite side of the transparency. The output of the photomultiplier for each sweep made by the flying spot is a wave form whose instantaneous amplitude at any point on the wave is proportional to the terrain altitude at that same point in range on the map's surface.

FIG. 16 shows a method whereby an opaque print 111 and camera tube 59 are used in lieu of the transparency and flying spot scanner to derive the terrain altitude voltage. The terrain elevation information is stored on the print as varying shades of gray. The highest terrain being depicted by white and lowest being depicted by black.

Figure 18:
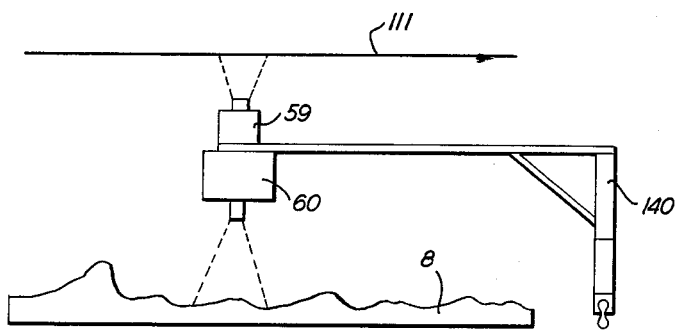
FIG. 18 shows the arrangements of opaque print and three-dimensional terrain map relative to the camera carrying apparatus.

This additional equipment just described may be mounted in a number of ways, the choice of mounting being determined by the space available. The transparency or opaque print may be mounted under the terrain model bed or suspended above the terrain model carriages as in FIG. 18 with the light source and pickup driven directly by the terrain model gantry 140. These auxiliary devices may also be mounted vertically on the side of the gantry or in a separate cabinet with servo drives for the light source and pickup devices receiving their inputs directly from the gantry servos.

The choice of either the transparency 110 or opaque print 111 techniques is dependent on the space available. It will be noted from FIGS. 15 and 16 that the transparency requires the use of devices mounted on either side of the plate while the opaque print need only have components on one side. The cost of either of these elevation storage medium is a function of the scale ratios required, the larger scale ratio being the more expensive choice. In operation the amplitude of the actual contour information voltage is compared to the preset clearance altitude amplitude voltage and when the contour information is greater than the desired clearance the video from the terrain model camera is gated into the operator's radar indicator permitting this video to be displayed. By this means only the video from objects above the clearance plane are displayed to the operator.

A unique method of producing a transparency, having high resolution altitude information contained thereon, has been devised. The transparency 110 as shown in FIG. 15 and the print 111 as shown in FIG. 16 are capable of providing accurate terrain variation or altitude information only to the extent of their own accuracy. Terrain transparencies which rely on models constructed from elevation lines are limited in their usefulness and accuracy due to the arbitrary interpolation or filling in between known elevation points. Previously used processes for producing two-dimensional storage of three-dimensional information required that contour information be extracted from charts or aerial photographs and hand painted on a flat opaque or flat transparent sheet of material. The resulting planar record of terrain elevation contains incremental elevation changes while the device produced by the above process contains continuous elevation data. The process disclosed herein results in an appreciable saving of time and material over the known processes. In radar simulation systems which require both a three-dimensional terrain model for ground mapping and a transparency or print for terrain avoidance control circuitry, the use of the described process with the three-dimensional model will assure compatability between the two information gathering mechanisms.

Figure 17:
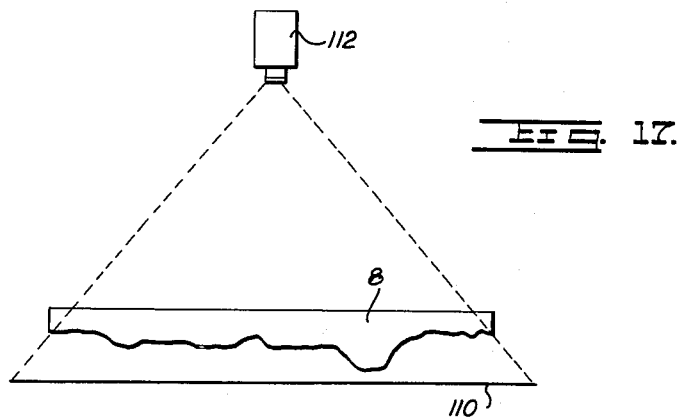
FIG. 17 is a representation of the method for producing a terrain transparency by radiation.

Various horizontal scale ratios of expansion and contraction may be obtained from a single three-dimensional mode through enlarging techniques. By the method about to be described, high resolution elevation and terrain transparencies may be produced which are capable of producing accurate altitude information for use with simulated radar systems. The resultant transparencies and any photographic prints made from them will have shading from black to white which will represent relative altitude at all points on the print. In this process, which is graphically shown in FIG. 17, a three-dimensional model 8 of the area of interest is scanned by penetrating rays from a source 112 so as to affect the emulsion of a sensitive plate 110 which is mounted parallel to the datum plane of the model and on the side opposite the source of rays. The ray generator may produce light, X-rays, neutrons, gamma or other rays. The penetrating rays striking the sensitive plate cause the emulsion on the plate surface to be altered as a function of the thickness of the material from which the model 8 is constructed. In the preferred embodiment an electromagnetic beam was directed through a plaster of Paris model onto the sensitive photoplate. As the model is three-dimensional, its thickness at every point on its surface is proportional to the terrain elevation. Any one of several materials would be suitable for the model, depending on the type of radiation used, lead being ideal with X-rays. The major consideration being that the material absorbs radiation in accordance with its thickness. The model form may be filled or surrounded with absorbent material. Since more radiation is absorbed by the thicker portions of the model the thicker portions will not affect the emulsion to the same extent as at the thinner model portions. The result is the recording on the emulsion of the terrain elevation in gradients inversely proportional to the terrain elevation which produces light transmissive characteristics proportional to terrain elevation.

Reduction of undesirable shadow effects may be accomplished through the use of parallel ray paths rather than a point source. Such an arrangement could be mechanized by moving the ray generator over the surface of the model from one side to the other, thereby assuring that the alignment of the rays passing through the model and impinging upon the photographic plate are perpendicular to the model. This type of scanning X-ray will improve the quality and accuracy of the transparency produced by reducing possible shadowing.

The above described process produces two-dimensional storage of terrain elevation or altitude information. The transparency or photographic prints made from the transparency derived by the above described process yields highly accurate terrain elevation information for use with ground mapping, contour mapping and terrain clearance radar simulation apparatus.

Since the emulsion density or light tranmissiveness of the transparency is a good measure of altitude, such a transparency, or photographic prints made from it, are ideal for use in the simulation of radio or radar altimeter indications.

The above process shows great promise as an aid to civil engineers and others who are concerned with absolute elevation or relative altitudes. By moving a light meter calibrated in elevation units over the surface of a transparency or print produced by the above process, a reading may be obtained which is proportional to the elevation at the point measured.

Figure 26:
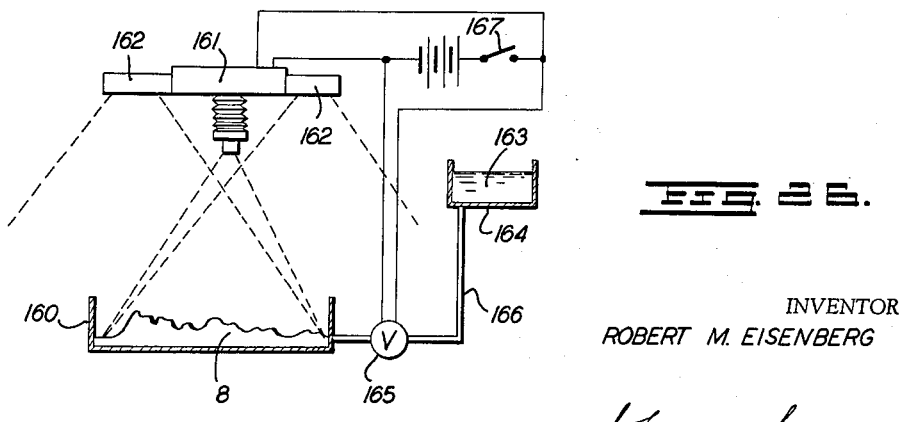
FIG. 26 shows apparatus for producing transparencies of terrain elevation by the photographic process.

A variation of the X-ray method of producing two-dimensional storage of terrain elevation information utilizes a three-dimensional model of the area of interest, black opaque fluid and photographic techniques. In the preferred embodiment, as shown in FIG. 26, a three-dimensional model 8 is painted white and placed in a tank 160 under a camera 161. Light sources 162 are placed so as to provide light rays parallel to the line of vision of the camera lens to thereby eliminate shadow effects. Small apertures are formed in the model at the lowest points in any map depression which has no natural drainage path to the sea level datum plane. Such a depression might represent a mountain lake, volcanic opening or other indentation. A dark opaque fluid 163, such as ink, is retained by valve 165 in container 164 and piping 166 until the process is commenced.

The camera shutter and valve controlling the flow of liquid into the tank are synchronized so that both are opened simultaneously. One such arrangement utilizes battery operated shutter and valve solenoids which open in response to the closing of switch 167. The camera shutter and piping valve are both held open until the terrain model 8 is completely covered with the liquid, and then they are closed. The areas of low elevation on the model will receive the shortest exposure time, since they will be covered by the liquid first, while the highest elevation will receive the longest exposure time. The negative thus produced will have an emulsion density proportional to terrain elevation.

As with the radiation method, undesirable shadowing effects may be minimized by increasing the number of light rays and the angle they strike the model or by movement of the camera over the model surface so that a more direct alignment between reflected light from the model and the photoplate is realized.

A variation of this process involves the use of cheese cloth or like material formed to the contour of the terrain. In such a case, as the ink or dark fluid entered the model area it would rise uniformly throughout the material and not be hampered by the physical obstructions of the model. Use of such material yields a more uniform gradient exposure.

The relative density of the exposure will be a relative measure of the terrain altitude while the general density may be controlled by the variations of any one of several parameters. Variations which may be made are in the lens aperture, the film speed, light intensity, fluid flow rate, and the film developing process.

It may easily be seen that this process, though simple in execution, provides an accurate representation of terrain contour and altitude for use in radar simulation apparatus or with other equipment which utilizes terrain contour or altitude information. A variation of this process would comprise the use of a dark colored model with a light colored fluid. In this case the lower levels of this model would provide exposure light for the longer period of time while the higher levels of the model would affect the photographic plate for a shorter time and therefore present a variation in terrain contour on the negative in accordance with the contours of the model.

Many modern day aircraft utilize a radio or radar altimeter for indicating to the pilot his exact distance above the ground. The use of this type of equipment has the advantage that the pilot need not know the altitude of the ground above sea level for determining his own altitude above the ground. Also, since the range limits of the radar altimeter are much less than a pressure activated instrument, but more accurate within the smaller range, accurate simulation of a radar altimeter is difficult to obtain. This invention provides apparatus for accurately simulating radar altimeter systems.

Since the terrain map transparency 110 of FIG. 15 and the terrain map print 111 of FIG. 16 have shading gradients between black and white in dependance upon terrain contour or altitude, the light passing through the transparency or reflected from the print at the point representing the simulated aircraft position is a measure of the aircraft altitude above the terrain at that point.

In reference to FIG. 4, it will be observed that the lowest point on the radar indicator represents the start of the cathode ray tube sweep. As the sweep originates at the point representing the aircraft position and moves radially from that point, the video level at the beginning of each sweep represents or is a measure of the altitude distance between the simulated aircraft and the terrain immediately below it.

The problem to be solved is illustrated by reference FIG. 27 in which the terrain line 170 represents the contour of the earth's surface beneath an aircraft 171. The sea level datum plane is indicated as 172. A pressure activated altimeter will read the distance between the aircraft 171 and the sea level line 172. A radar altimeter will read the distance between the aircraft and the terrain line 170. Apparatus for simulating the indications of a radar altimeter therefore will utilize the absolute altitude measurement from simulated aircraft to sea level and subtract from it the depth or distance between the terrain line 170 and the sea level datum line 172. The resulting distance will be the distance between the aircraft and the terrain line.

This invention provides apparatus utilizing the land mass generator for obtaining an accurate radar altimeter simulation. FIG. 28 shows the preferred embodiment of this system in which certain portions of the land mass simulator and their associated video circuitry are utilized to provide the terrain depth information. As shown in FIG. 28 the master synchronizer and sweep circuit generator 18 is the same unit as shown in FIG. 1 having the numerical designation 18. In like manner, the deflection amplifiers and clamp circuits 40 the video amplifier 14, the camera 59 and its associated prism 41 are shown in FIG. 1 of the land mass simulator.

As the camera is continuously sweeping from a point directly under the position of the simulated aircraft out to the range of the radar being simulated, the video occurring at the beginning of each sweep is a measure of the instantaneous terrain thickness directly under the aircraft. This invention utilizes the measure of absolute altitude and subtracts from it the terrain thickness or depth measurement to yield aircraft to terrain distance in the form of a D.C. voltage for activation of radar altimeter indicators. In FIG. 28 a pulse shaper 173 receives a synchronized pulse of the master synchronizer 18 by way of connector 174. This shaper generates a pulse for transmission by conductor 175 to the mixer 176. The capital letter "T" corresponds in time to the period of the sweeps generated by the master sweep circuits and is indicated by the signal shown on conductor 42. The video terrain signal is sent from a video amplifier 14 to a mixer 176 where the pulse shaper pulse from lead 175 is modulated with the terrain video. The effect of this is to produce a signal as shown at the mixer output 177 in which the pedestal or pulse containing the video of a sweep initiation occurs at the beginning of each period followed by that video resulting from a remainder of the sweep time. The pulse shaper 173 also produces a D.C. reference level on conductor 178 which is analagous to the pulse height appearing on conductor 175. The combination of the D.C. reference level with the pulsed video from lead 177 results in the signal shown on conductor 179, which is a measure of the terrain video for a period dependent on the pulse width of the shaper pulse. This video is conducted to the pulse stretcher 180 which time averages the signal representative of the terrain contour immediately under the simulated aircraft to yield a positive D.C. signal proportional to the video amplitude on conductor 179. This D.C. level is summed at summing amplifier 182 with a negative D.C. signal which is proportional to the distance between the simulated aircraft and the sea level datum line. This signal is obtained from an altitude shaft or analogue computer 183 which provides a D.C. signal proportional to aircraft altitude and of polarity opposite to that of the terrain amplitude. This D.C. voltage is conducted to summing amplifier 182 by means of conductor 184. The summation or subtraction of the two signals results in a D.C. voltage on lead 185 which is proportional to the difference between the aircraft to sea level distance and the terrain line to sea level distance. This measure of aircraft altitude above the terrain is then fed to amplifier and limiter circuits 186 which, in turn, activate the radar altimeters 187. The radar altimeter indication therefore at any time is a measure of the distance between the aircraft and the terrain immediately below the simulated aircraft position. The omission of the altitude input to amplifier 182 would yield an indication of terrain altitude which may be desirable in some applications.

Another method for simulating radar altimeter apparatus is indicated in FIG. 29 in which the contour plate or print 111 is mounted proximate to the gantry so as to be viewed by detector apparatus. The contour plate or print 111 contains black to white shading in dependence upon the terrain thickness at all points and light reflected from it will be a measure of this terrain thickness. In the apparatus shown in FIG. 29 a photocell or photomultiplier is mounted with the camera so as to scan a portion of the contour plate 111 in dependence upon movements of the simulated aircraft over the terrain. A light source 2 is supplied to give uniform lighting over the surface of the photo or contour plate 111. The lens 190 is focussed on the point of interest directly below the simulated aircraft position. Its output is a D.C. signal proportional to the terrain altitude above sea level and this information is fed by conductor 191 to summing amplifier 192. As in the last example, an altitude shaft or computer 183 provides a negative D.C. signal on conductor 184 which is proportional to the aircraft altitude above sea level. The addition of these two oppositely polarized voltages results in a D.C. voltage on conductor 185 which is a measure of the difference between the distance between aircraft to sea level and the distance between the terrain line to sea level. This resulting aircraft to terrain analogue voltage is fed to amplifier and limiter 186 and thence to the radar altimeters 187.

The video type of radar altitmeter utilizes video information available from the ground contour plate of the land mass simulator to provide the voltages necessary to activate the radar altitude indicators. The photocell method requires fewer components to utilize the information necessary for activation of the radar altimeters but does require the additional photo cell unit to be mounted upon the gantry. Both methods utilize the photographic or contour plate or transparency to obtain information regarding the distance between the terrain line and the sea level datum plane. In the photo cell method of radar altimeter simulation if it is desired to use a transparency rather than the print 111 a scanner must be mounted on the opposite side of the transparency from the photo cell or the photo multiplier. The position of the light source also depends on whether the contour plate is a transparency or an opaque substance. If the opaque material is used the light source must be on the same side of the plate as the photo cell unit whereas the use of a transparency necessitates the light source being upon the opposite side of the plate from the photo cell. Each of the apparatus just described provide high resolution radar altimeter simulation from the information present on the contour plate the sensitivity of the photo cell method depends to a large extent upon the focussing of the photo cell lens. If a small point of area is scanned the variations of radar altimeter indication will be more abrupt and more sensitive than if a larger area is scanned during the simulated flight. It may be readily seen that if a large area is scanned by the photo cell or photo multiplier and the simulated aircraft moves across the terrain map the change in photo cell level will not be a rapid one and the resulting radar altimeter indications will then be the more gradual nature than if a small area or point is scanned by the photo cell.

The feedback connection 189 between the light source 2 and the photocell 190 of FIG. 29 is representative of stabilizing means available for assuring constancy of indications. This is obtained by monitoring the intensity of the light source 2 and feeding back to the photocell or photomultiplier 190 a signal analogous to the light intensity. This signal is utilized to vary the sensitivity of the photocell. The overall effect is to increase the sensitivity of the photocell if the light intensity decreases and to decrease the photocell intensity if the light intensity increases. This provides stable photocell output in spite of variations which may occur in the light intensity.

The techniques described in this invention provide a solution to many of the problems which have made other radar simulation techniques unattractive.

The maintenance requirements of the system are kept to a minimum through the use of a non-critical propagation medium and a technique which does not require high intensity light sources with their attendant heat problems.

Reliability is attained through the utilization of proven pulse circuitry and a method which does not require the large mass, camera-optical system to closely track the terrain map.

Fidelity of simulation of the radar presentation is made possible through the use of a high resolution, light sensitive device and methods to achieve good altitude effects and a target aspect realism not available by other known means.

Flexibility is realized through providing a means for changing the target complex areas of a terrain model. Further, the entire map may be replaced and aligned rapidly to represent other known areas of interest. Modification for new radar characteristics is simply a matter of replacing those portions of the light source, sweep and gating circuitry affected.

The methods of producing the two-dimensional transparencies from three-dimensional information and their resulting high resolution or altitude variation indication represent great improvements over previous devices.

The apparatus for simulating a radar altimeter system described herein indicates to a student operator the distance between his simulated aircraft and the ground level to a higher degree of accuracy than hitherto possible.

It should be understood that this invention is not limited to specific details of construction and arrangement herein illustrated and that changes and modifications may occur to one skilled in the art without departing from the spirit of the invention; the scope of the invention being set forth in the following claims.

What is claimed is:

1. In a training device having radar operator altitude controls, apparatus for simulating a contour mapping mode of radar operation comprising three dimensional model means having contour variations, video means responsive to the said contour variations and to manipulation of radar operator altitude controls for providing a video signal output responsive to the model means and operator altitude controls, said video means including a television camera having a photocathode plate and means for projecting an optical image of said model on said plate and means for electronically scanning said plate, indicating means responsive to the said video means output for displaying a simulated radar presentation, said video means including gating means connected to said altitude controls for limiting said presentation to those targets which exist within the altitude plane selected by the operator's altitude controls.

2. In a simulated aircraft training device having simulated operator altitude and range controls, apparatus for simulating a terrain avoidance mode of radar system operation comprising three dimensional model means having contour variations, contour elevation measuring means, video means responsive to said elevation measuring means and the said contour variations and to manipulation of said radar operator controls for providing a video signal output responsive to the model means and said controls, said video means including a television camera having a photocathode plate and means for projecting an optical image of said model on said plate and means for electronically scanning said plate, indicating means responsive to the said video means output for displaying a simulated radar presentation which is limited to those targets which exist within the clearance plane of the aircraft selected by the operator's controls.

3. Radar training apparatus comprising a three dimensional model of ground terrain, a transparency having variations thereon analogous to elevation variations in the ground terrain, first detecting means arranged to view the said model and to generate signals in response to the scene viewed, second detecting means arranged to view the said transparency and generate signals in response to variations in elevation of the ground terrain, and indicating means responsive to the outputs of the said first and second detecting means for displaying a simulated radar presentation of the scene viewed as modified by elevation variations.

4. Radar training apparatus comprising a three dimensional model of ground terrain, an opaque print having variations thereon analogous to elevation variations in the ground terrain, first detecting means arranged to view the said model and to generate signals in response to the scene viewed, second detecting means arranged to view the said opaque print and generate signals in response to variations in the ground terrain, and indicating means responsive to the outputs of the said first and second detecting means for displaying a simulated radar presentation of the scene viewed as modified by elevation variations.

5. In an instruction device having means for computing flight quantities and radar antenna positions, radar simulation apparatus comprising a three dimensional model of land masses, means to illuminate said model constantly, a television camera mounted proximate the said model, means for moving the camera relative to the model in accordance with the computed flight quantities, said camera including means for scanning the image produced by said camera, video means for controlling and modifying the information received by the camera in accordance with the radar antenna positions, and indicating means responsive to the said video means for displaying the information received by the camera, the said indicating means including a cathode ray tube upon which are displayed indications of land masses as viewed by the camera, said illuminating means comprising a light source and a light conducting pipe extending therefrom toward said model, and means for moving said light pipe toward and from said model in accordance with simulated altitude of the radar antenna.

6. Apparatus according to claim 5, comprising contact closing means responsive to collision of said light conducting pipe with said model.

7. Apparatus according to claim 5 including means for moving said light source in accordance with said computed flight quantities.

8. Apparatus according to claim 5, wherein said light pipe has an emitting end oriented to illuminate a sector of said model, said light pipe being mounted for rotation about an axis perpendicular to said model.

References Cited in the file of this patent

UNITED STATES PATENTS

| | | |
|---|---|---|
| 2,591,752 | Wicklund | Apr. 8, 1952 |
| 2,737,730 | Spencer | Mar. 13, 1956 |
| 2,788,588 | Lindley | Apr. 16, 1957 |
| 2,838,848 | Bergstad et al. | June 17, 1958 |
| 2,841,886 | Cutler | July 8, 1958 |
| 2,924,026 | Domeshek | Feb. 9, 1960 |
| 2,941,311 | Rosenfeld et al. | June 21, 1960 |

FOREIGN PATENTS

| | | |
|---|---|---|
| 753,365 | Great Britain | July 25, 1956 |
| 805,294 | Great Britain | Dec. 3, 1958 |